United States Patent [19]

Ahrendt

[11] Patent Number: 4,791,343
[45] Date of Patent: Dec. 13, 1988

[54] STEPPER MOTOR SHAFT POSITION SENSOR

[75] Inventor: Terry J. Ahrendt, Gilbert, Ariz.

[73] Assignee: Allied-Signal Inc., Morris Township, Morris County, N.J.

[21] Appl. No.: 91,676

[22] Filed: Aug. 31, 1987

[51] Int. Cl.$^4$ .............................................. H02P 8/00
[52] U.S. Cl. .................................. 318/696; 318/685; 368/66; 368/80
[58] Field of Search ............... 318/696, 685; 368/661, 368/80, 157

[56] References Cited

U.S. PATENT DOCUMENTS

| | | | |
|---|---|---|---|
| 2,654,860 | 10/1953 | Lewis | 318/490 |
| 3,267,346 | 8/1966 | Liang et al. | 318/138 |
| 3,384,796 | 5/1968 | Shah | 318/7 |
| 4,216,648 | 8/1980 | Maire | 368/66 |
| 4,272,837 | 6/1981 | Ueda et al. | 368/80 |
| 4,275,342 | 6/1981 | Kawada et al. | 318/490 |
| 4,305,028 | 12/1981 | Kostas et al. | 318/565 |
| 4,381,481 | 4/1983 | Kuppers et al. | 318/696 |
| 4,422,040 | 12/1983 | Raider et al. | 324/158 MG |
| 4,551,665 | 11/1985 | Antognini et al. | 318/696 |

FOREIGN PATENT DOCUMENTS

| | | |
|---|---|---|
| 7331703 | 4/1974 | France . |
| 59-35598 | 2/1984 | Japan . |
| 429478 | 5/1935 | United Kingdom . |

OTHER PUBLICATIONS

*Step Motors and Control Systems*, Kuo, p. 283, 1979.

Primary Examiner—William M. Shoop, Jr.
Assistant Examiner—Saul M. Bergmann
Attorney, Agent, or Firm—James W. McFarland; Robert C. Smith

[57] ABSTRACT

A stepper motor shaft position sensor differentiates the current provided when the stepper motor is excited as by a step command voltage. The differentiated current is, in effect, a signature indicative of whether or not the motor shaft has taken a step. If the differentiated current falls below a predetermined level within a predetermined interval the motor shaft has taken a step as indicated by a sensor output at a predetermined logic level. Otherwise, the sensor output is at another predetermined logic level indicating that a step has not been taken and the motor is in a stalled condition. The sensor output is applied to a utilizing means which provides a continuous verification of the steppper motor shaft position.

28 Claims, 3 Drawing Sheets

STEPPER MOTOR SHAFT POSITION SENSOR

BACKGROUND OF THE INVENTION

A shaft position sensor as disclosed herein is typically used with a digitally controlled stepper motor which drives a hydraulic or pneumatic control valve, such as a butterfly valve, for controlling airflow in an aircraft cabin environmental control system. The sensor may also be used with a butterfly valve in an engine fuel control system, as the case may be.

The disclosed invention verifies whether or not the motor shaft has taken a step in response to a command input and provides information which may be fed back to a digital controller or the like to determine discrepancies between actual and commanded stepper motor shaft displacement. In this regard it will be appreciated that a single digital controller can monitor a multitude of such information for presentation on a single cathode ray tube (CRT) display to the pilot of the aircraft, and thereby provides a continuous verification of the motor shaft position. By way of comparison, analog systems for the purposes described typically generate a valve position feedback signal for display on a dedicated cockpit gauge.

Heretofore digital systems for sensing stepper motor shaft position have used optical decoders or the like mounted to the shaft of the stepper motor. This arrangement, with its additional hardware, increases the cost of the sensor, while decreasing its reliability.

The present invention senses displacement of a stepper motor shaft by sensing a particular signature of the motor current, i.e. the derivative of the current when the motor is excited. If the derivative of the current does not fall below a certain level during a certain time the motor shaft has not taken a step.

Prior art arrangements relating to sensors used in conjunction with motors of which the present inventor is aware are described in U.S. Pat. Nos. 2,654,860; 3,267,346; 3,384,796; 4,422,040; 4,305,028; and 4,275,342. The inventor is also aware of U.K. Patent Specification No. 429,478 and Japanese Patent No. 59-35598.

U.S. Pat. No. 2,654,860 issued to Lewis in 1953 senses a change in load for an AC motor as a function of motor current. The present invention senses movement of a stepper motor shaft using sensed motor current and hence is distinguished from the sensor of the patent.

U.S. Pat. No. 3,267,346 issued to Liang, et al in 1966 uses an external sensor, i.e. a carrier means and a switch, to sense shaft position in order to synchronize pulses applied to a sensor motor and is thus distinguished from the present invention.

U.S. Pat. No. 3,384,796 issued to Shah in 1968 relates to a control arrangement for stopping a drive motor and uses a tachometer for sensing the rate of change of speed of the motor, and accordingly is also distinguished from the present invention.

U.S. Pat. No. 4,422,040 issued to Raider, et al in 1983 relates to testing stepper motors, wherein the back EMF of the motor is compared to desired motor characteristics, and is hence not seen as directed to the present invention.

U.S. Pat. No. 4,305,028 issued to Kostas, et al in 1981 relates to an arrangement for evaluating whether or not a robot can perform a series of programmed motions by comparing the velocity of the links of a robot simulator against predetermined velocity limits which will reproduce programmed steps. This patent is likewise not seen as directed to the present invention.

U.S. Pat. No. 4,275,342 issued to Kwada, et al in 1981 relates to control apparatus for a DC motor wherein a tachometer output is sensed with motor voltage. If one occurs without the other an alarm is generated. This patent is also not seen as directed to the present invention.

U.K. Patent Specification No. 429,478 dated May, 1985, and in the name of CHF Muller Aktiengesellschaft relates to sensing movement of a rotor subjected to the stator field of an induction motor and is hence seen to be different than the present invention.

Japanese Pat. No. 59-35598 dated February, 1984 and in the name of Fujitsu, et al relates to sensing the stepping of a pulse motor. The patent teaches determining whether or not the motor shaft has taken a step by looking at the motor current to see if the current reaches a particular level within a particular time. If this occurs, the motor shaft has not taken a step. The present invention is distinguished over the arrangement of the patent in that whether or not the motor has taken a step is determined by looking at the derivative of the motor current. This arrangement has distinct advantages over merely looking at the current as in the Japanese patent. For example, extraneous influences can easily affect the current waveform as observed in the Japanese patent, and thereby give a false or ambiguous indication as to whether or not the motor shaft has taken a step. This ambiguity is eliminated when the derivative of the current waveform is observed as in the present invention, and hence a more accurate and reliable sensor is provided. Accordingly, the present invention is seen to distinguish over the teachings of the Japanese patent.

SUMMARY OF THE INVENTION

This invention contemplates a stepper motor shaft position sensor wherein the motor current provided upon excitation of the motor is differentiated. If the differentiated current falls below a predetermined value during a predetermined interval the motor shaft has taken a step and the sensor output is at a logic "high." If the differentiated current does not fall below the predetermined value during the predetermined interval the sensor output is at a logic "low" indicating that the stepper motor has not taken a step and the motor is in a stalled condition. The output of the sensor is applied to a utilizing means such as a controller or the like so that the position of the motor shaft is continuously verified.

Accordingly, there is disclosed and claimed herein a stepper motor shaft position sensor comprising means for sensing the current developed by the stepper motor when said motor is excited and for providing a motor current signal; means for differentiating the motor current signal and for providing a differentiated signal; means for providing a signal at a predetermined level; means for comparing the differentiated motor current signal and the signal at a predetermined level and for providing a comparison signal; means for providing a signal during a predetermined interval; means connected to the comparing means and the means for providing a signal during a predetermined interval and responsive to the comparison signal and the signal during the predetermined interval for providing an output signal, the output signal being at a first logic level when the motor shaft has taken a step and being at a second logic level when the motor shaft is stalled; and means connected to the means for providing the signals at the first and second logic levels for verifying the position of the stepper motor shaft.

DETAILED DESCRIPTION OF THE INVENTION

Figure 1:
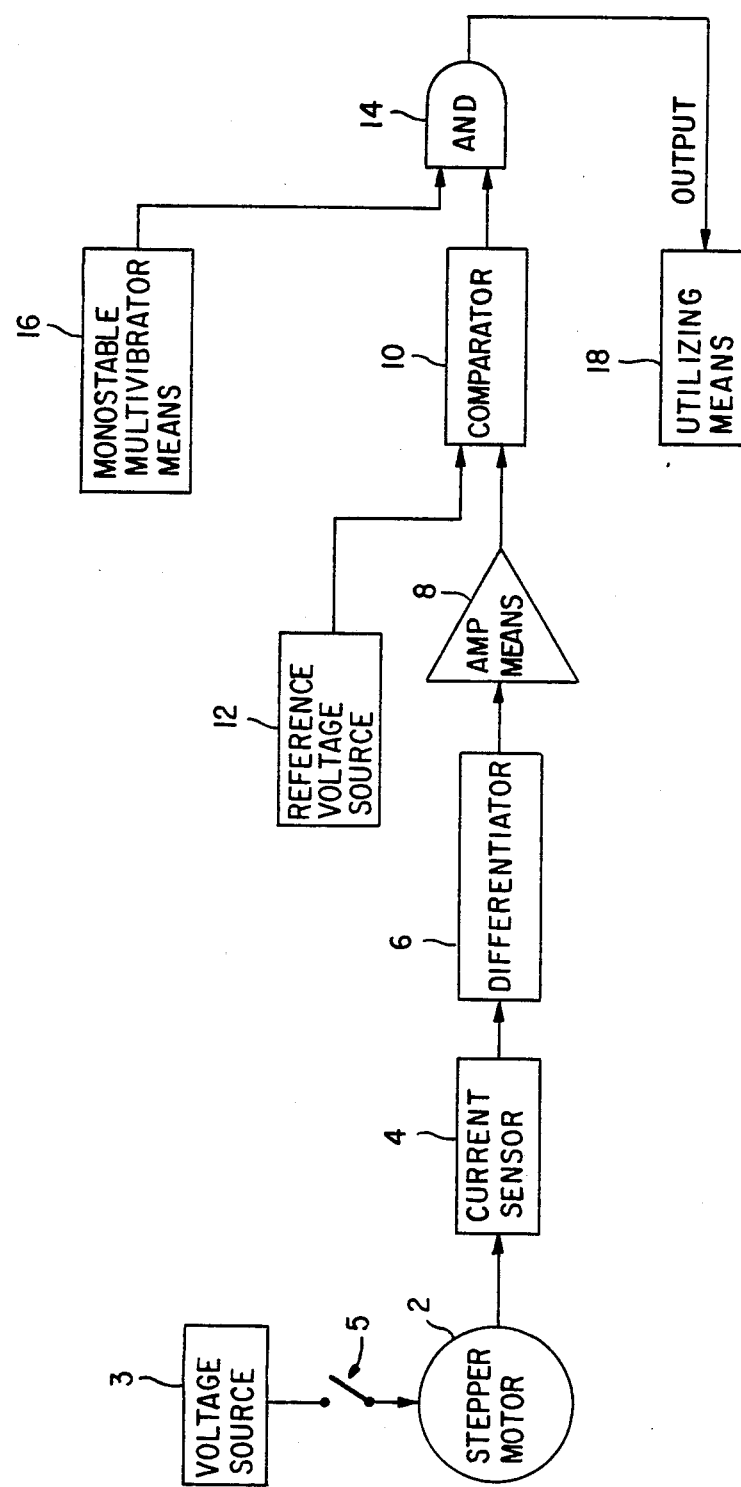
FIG. 1 is a block diagram generally illustrating the structural arrangement of the components of the invention.
Figure 4:
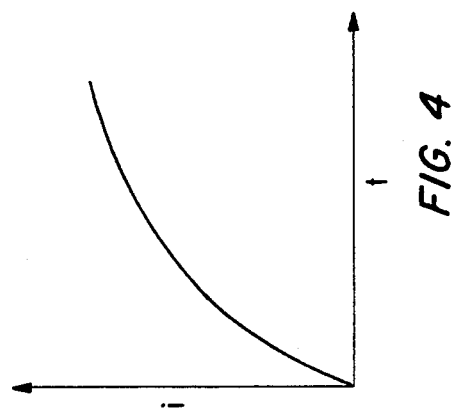
FIG. 4 is a graphical representation showing the motor current waveform when the stepper motor has not taken a step, i.e. is in a stalled position.
Figure 3:
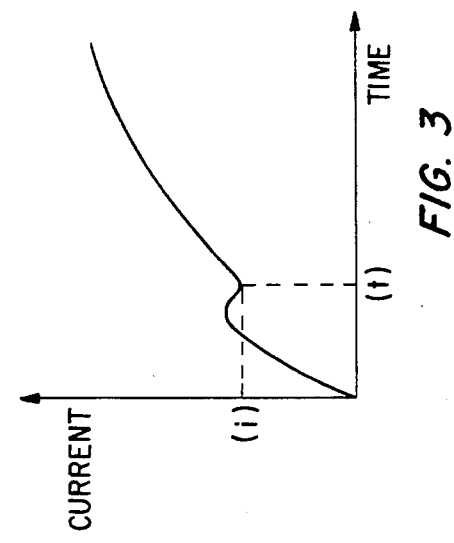
FIG. 3 is a graphical representation showing the motor current waveform when the stepper motor has taken a step.

With reference first to FIG. 1, a stepper motor is designated by the numeral 2. A current sensor 4 is connected to stepper motor 2 and senses the current produced by an excitation voltage applied to stepper motor 2 by a voltage source 3 via a normally open switch 5. Sensor 4 provides a signal having a waveform as shown in FIGS. 3 or 4, depending on whether or not motor 2 has taken a step, as will hereinafter be further explained.

Figure 6:
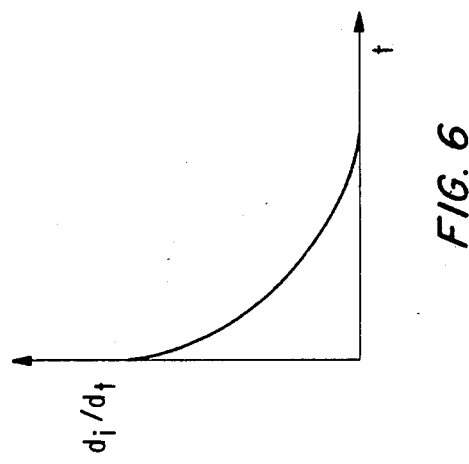
FIG. 6 is a graphical representation showing the waveform of the derivative of the motor current having a waveform as shown in FIG. 4.
Figure 5:
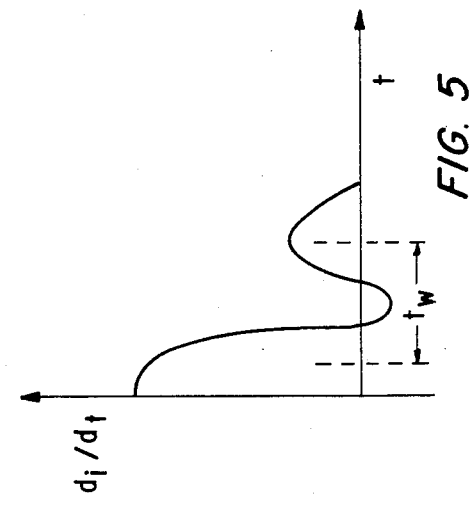
FIG. 5 is a graphical representation showing the waveform of the derivative of the motor current having a waveform as shown in FIG. 3.

The signal from current sensor 4 is applied to a differentiator 6 and therefrom through an amplifier means 8 to a comparator 10. Differentiator 6 provides a signal having a waveform as shown in FIGS. 5 or 6, depending on whether or not motor 2 has taken a step as will hereinafter be further described.

Comparator 10 compares the signal from amplifier 8 to the signal from a reference voltage source 12 and provides a signal in accordance with said comparison which is applied to AND gate 14.

A monostable multivibrator means 16, commonly known as a "one-shot", provide a signal which is applied to AND gate 14. AND gate 14 is responsive to the signals from comparator 10 and one-shot 16 and provides an output signal which is applied to a utilizing means 18. Utilizing means 18 may be a digital controller or the like which drives a cathode ray tube (CRT) to present information to an observer such as a pilot of an aircraft indicating whether or not the shaft of stepper motor 2 has taken a step or is stalled, as the case may be. Thus, utilizing means 18 verifies the position of the stepper motor shaft as will now be understood.

Figure 2:
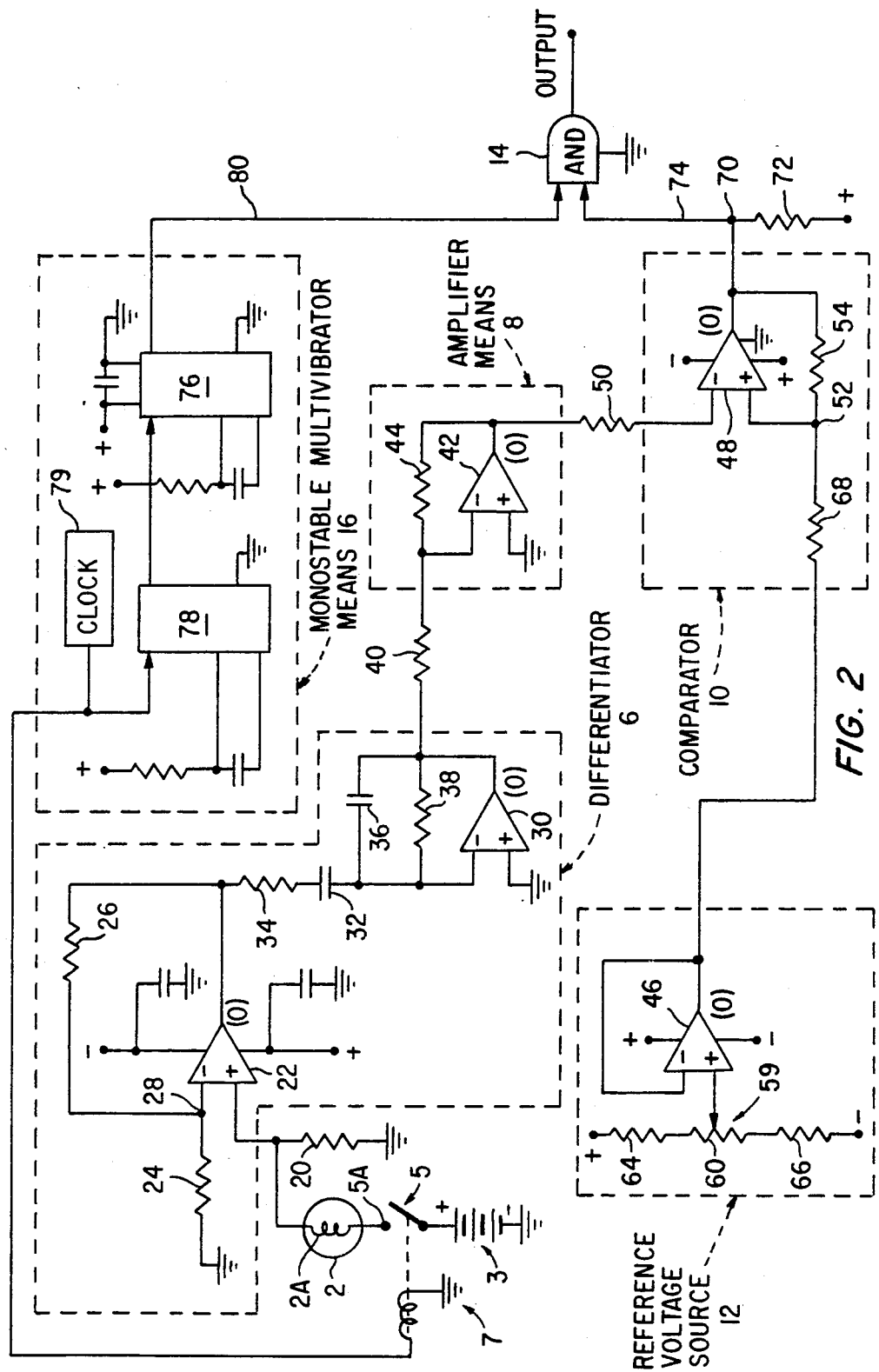
FIG. 2 is an electrical schematic diagram illustrating in substantial detail the components of the invention and the structural arrangement thereof.

With reference to FIG. 2, current sensor 4 is essentially a resistor 20 having one leg connected to ground and the other leg connected to differentiator 6. Motor 2 includes a coil 2A having one leg connected intermediate the other leg of resistor 20 and differentiator 6. The other leg of motor coil 2A is connected to a terminal 5A of switch 5. It will be noted that the voltage from voltage source 3 applied to motor coil 2A via switch 5 when the switch is closed as will b hereinafter described may be a command for stepping the shaft of motor 2, and sensor 4 provides a signal in response to said command.

Differentiator 6 includes an operational amplifier 22 having an inverting input terminal (−) and a non-inverting input terminal (+). Resistor 20 is connected to the non-inverting input terminal (+) of amplifier 22 and a grounded resistor 24 is connected to the inverting input terminal (−) of the amplifier. A resistor 26 is connected in feedback relation to an output terminal (O) of amplifier 22 and to a circuit point 28 intermediate resistor 24 and the inverting input terminal (−) of the amplifier.

Differentiator 6 further includes an operational amplifier 30 having a grounded non-inverting input terminal (+) and an inverting input terminal (−) connected to output terminal (O) of amplifier 22 through a capacitor 32 and a resistor 34 serially connected to capacitor 32. A feedback loop including a capacitor 36 connected in parallel with a resistor 38 is connected to an output terminal (O) of amplifier 30 and to the inverting input terminal (−) thereof.

Amplifier means 8 includes an operational amplifier 42 and is connected to differentiator 6 through a resistor 40 connected to the output terminal (O) of amplifier 30 and to an inverting input terminal (−) of amplifier 42. Amplifier 42 has a grounded non-inverting input terminal (+).

A resistor 44 is connected in feedback relation to an output terminal (O) of operational amplifier 42 and to the inverting input terminal (−) thereof.

Reference voltage source 12 includes an operational amplifier 46. An output terminal (O) of amplifier 46 is connected in feedback relation to the inverting input terminal (−) thereof. A potentiometer 59 includes a variable resistor 60 connected to the non-inverting input terminal (+) of amplifier 46. A resistor 64 connected to a positive (+) source of voltage is connected to one leg of resistor 60 and a resistor 66 connected to a negative (−) source of voltage is connected to the other leg of resistor 60. An output terminal (O) of amplifier 46 is connected to circuit point 52 through a resistor 68.

Comparator 10 includes an operational amplifier 48. The inverting input terminal (−) of operational amplifier 48 is connected through a resistor 50 to the output terminal (O) of amplifier 42 of amplifier means 8. The non-inverting input terminal (+) of amplifier 48 is connected to circuit point 52. A resistor 54 is connected in feedback relation to amplifier 48, having one leg connected to circuit point 52 and another leg connected to an output terminal (O) of amplifier 48. Said output terminal (O) of amplifier 48 is connected to a circuit point 70 which is connected to a resistor 72. Resistor 72 is connected to a positive (+) source of voltage. A conductor 74 leads from circuit point 70 to AND gate 14.

Monostable multivibrator means 16 includes an arrangement of dual monostable multivibrators or one-shots 76 and 78. One-shot 78 is driven by the pulses from a clock 79 and drives one-shot 76. The output from one-shot 76 is directed through a conductor 80 to AND gate 14.

AND gate 14 responds to the outputs thereto from amplifier 48 and from one-shot 76 through conductors 74 and 80, respectively, to provide a logic "high" output when the shaft of stepper motor 2 has taken a step and to provide a logic "low" output when the stepper motor shaft has not taken a step as when motor 2 is stalled, as will hereinafter be more fully described.

OPERATION OF THE INVENTION

The stepper motor shaft position sensor of the invention verifies the position of the shaft of stepper motor 2. This is achieved by observing the waveform of the motor current when the motor is excited by a voltage from voltage source 3.

As shown in FIGS. 3 and 4, the motor current generally increases with time in an inductance/resistance (L/R) relationship. If stepper motor 2 takes a step the current will dip to a level (i) at a time (t) as shown in FIG. 3. If a step has not been taken the current rises in a smooth L/R curve as shown in FIG. 4.

The current so provided is differentiated by differentiator 6. As shown in FIGS. 5 and 6, the differentiated current (di/dt) generally decreases with time. If the differentiated current falls below a predetermined level within a predetermined time as shown in FIG. 5, AND gate 14 provides a logic "high" output indicating that the stepper motor shaft has taken a step. If the differentiated current does not fall below the predetermined level within the predetermined time and decreases smoothly with time as shown in FIG. 6, the output of AND gate 14 will be a logic "low" indicating that the stepper motor shaft did not take a step, i.e. the motor is stalled. Utilizing means 18 responds to the logic "high" output or the logic "low" output, as the case may be, to verify the position of the stepper motor shaft.

AND gate 14 responds to the outputs of monostable multivibrator or one-shot means 16 and comparator 10 to provide the logic "high" or logic "low" outputs. Comparator 10 receives the output from differentiator 6 through amplifier means 8 and receives the output from potentiometer 59. Potentiometer 59 is adjustable to provide the predetermined level which the differentiated current falls below to indicate that a step has been taken. Monostable multivibrator or one-shot means 16 is effective for providing a time "window" $t_w$ (FIG. 5) within which the differentiated current falls below the aforenoted predetermined level to indicate that said step has been taken.

In regard to monostable multivibrator or one-shot means 16, it will be understood that the monostable arrangement has one stable state and one quasi-stable state. The pulse output from clock 79 closes switch 5 via a relay 7 to apply the voltage from voltage source 3 to motor coil 2A. Simultaneously multivibrator 78 is triggered to induce a transition of multivibrator means 16 from the stable state to the quasi-stable state. The multivibrator means remains in the quasi-stable state for a predetermined interval and eventually will revert to its stable state without an external signal being required to include the reversion. The interval during which the multivibrator means remains in its quasi-stable state is the interval during which the differentiated current must fall to the predetermined level, which is indicative that the shaft of motor 2 has taken a step within the required time window $t_w$ (FIG. 5).

In summary, the invention senses a particular signature of the stepper motor current when the stepper motor is excited. The signature is provided when the current is differentiated. If the differentiated current falls below a predetermined level as determined by potentiometer 59 within a predetermined interval as determined by monostable multivibrator means 16 a step has been taken by the stepper motor shaft and the sensor provides a logic output indicative of same. If the differentiated current does not fall below the aforenoted predetermined value during the aforenoted predetermined interval the sensor output is at another logic level indicating that the sensor motor shaft did not take a step and the motor is in a stalled condition.

With the above description of the invention in mind reference is made to the claims appended hereto for a definition of the scope of the invention.

What is claimed is;

1. A stepper motor shaft position sensor, comprising:
   means for sensing the current developed by the stepper motor when said motor is excited and for providing a motor current signal;
   means for differentiating the motor current signal and for providing a diffrnetiated signal including a first operational amplifier connected to the means for sensing the motor current, and a second operational amplifier connected to the first operational amplifier and providing the differentiated signal;
   means for providing a reference signal at a predetermined level;
   means for comparing the differential motor current signal and the signal at a predetermined level and for providing a comparison signal;
   means for providing a signal during a predetermined internal;
   means connected to the comparing means and the means for providing a signal during a predetermined interval and responsive to the comparision signal and the signal during the predetermined interval for providing an output signal, the output signal being at a first logic level when the motor shaft has taken a step and being at a second logic level when the motor shaft is stalled; and
   means connected to the means for providing the signals at the first and second logic levels for indicating the step status of the stepper motor shaft.

2. A stepper motor shaft position sensor as described by claim 1, wherein:
   the output signal is at the first level when the differentiated signal falls below the predetermined level during the predetermined interval, with said output signal otherwise being at the second logic level.

3. A stepper mtor shaft position sensor as described by claim 1, wherein the means for sensing the current developed by the stepper motor when said motor is excited and for providing a motor current signal, includes:
   a resistor arranged with the stepper motor and having one leg connected to ground; and
   the motor current signal provided at the other leg of the resistor.

4. A stepper motor shaft position sensor as described by claim 3, wherein said first operational amplifier is connected at an input terminal thereof to said other leg of the resistor; and
   said second operational ampifier is connected at an input terminal thereof to an output terminal of the first operational amplifier.

5. A stepper motor shaft position sensor as described by claim 4, including:
   a resistor connected to the input terminal of the second operational amplifier and to an output terminal thereof; and
   a capacitor connected in parallel with the resistor.

6. A stepper motor shaft position sensor as described by claim 4, wherein:
   the input terminal of the first operational amplifier is a non-inverting input terminal and said operational amplifier has an inverting input terminal connected to a resistor, with said resistor connected to ground.

7. A stepper motor shaft position sensor as described by claim 5, wherein:
the input terminal of the second operational amplifier is an inverting input terminal and said second operational amplifier has a non-inverting input terminal connected to ground.

8. A stepper motor shaft position sensor as described by claim 5, including:
a resistor connected to the output terminal of the second operational amplifier; and
amplifier means connected to the resistor.

9. A stepper motor shaft position sensor as described by claim 8, wherein the amplifier means includes:
an operational amplifier having an inverting input terminal connected to the resistor and a non-inverting input terminal connected to ground; and
a resistor connected to the inverting input terminal and to an output terminal of the operational amplifier.

10. A stepper motor shaft position sensor as described by claim 9, wherein the means for providing a reference signal at a predetermined level includes:
a variable resistor;
a first resistor having one leg connected to a voltage source of one polarity and the other leg connected to one leg of the variable resistor;
a second resistor having one leg connected to a voltage source of an opposite polarity and the other leg connected to the other leg of the variable resistor; and
an operational amplifier having a non-inverting input terminal connected to the variable resistor and an inverting input terminal connected in feedback relation to an output terminal.

11. A stepped motor shaft position sensor as described by claim 9, wherein the means for comparing the differentiated motor current signal and the signal at a predetermined level and for providing a comparison signal includes:
an operational amplifier connected to an output terminal of the operational amplifier of the amplifier means and connected to the output terminal of the operational amplifier of the reference signal means.

12. A stepper motor shaft position sensor as described by claim 11, wherein the operational amplifier of the comparing means includes:
a non-inverting input terminal connected to the output terminal of the operational amplifier of the reference signal means; and
an inverting input terminal connected to the output terminal of the operational amplifier of the amplifier means.

13. A step motor shaft position sensor as described by claim 12, wherein the operational amplifier of the comparing means includes:
a resistor connected in feedback relation to the non-inverting input terminal and to an output terminal thereof.

14. A stepper motor shaft position sensor as described by claim 13, wherein the means connected to the comparing means and to the means for providing a signal during a predetermined interval includes:
an AND gate responsive to the comparison signal and the signal during the predetermined interval for providing an output signal at a first logic level when the motor shaft has taken a step, and for providing an output signal at a second logic level when the motor shaft is stalled.

15. A stepper motor shaft position sensor as described by claim 1, wherein the means for providing a signal during a predetermined interval includes:
a first monostable multivibrator;
a clock for providing driving pulses;
the first monostable multivibrator connected to the clock and driven by the pulses therefrom; and
a second monostable multivibrator connected to the first monostable multivibrator and driven thereby for providing the signal during the predetermined interval.

16. A stepper motor shaft position sensor as described by claim 15 including:
a signal source:
the motor including coil means, and normally open switching means connecting the signal source to the motor coil means; and
means connected to the clock and to the normally open switching means and responsive to he pulse provided by the clock for closing said switching means, whereby the signal from the signal source is applied to the motor coil means for exciting said means.

17. For use with a stepper motor of the type which is energized by a motor shaft step command signal to provide a motor current, a sensor for sensing the motor current and for verifying if the motor shaft has taken a step in response to the step command signal, comprising:
means for sensing the motor current icnluding a resistor arranged with said stepper motor and having one leg connected to ground, and a motor current signal provided at the other leg of said resistor;
means for differentiating hte sensed motor current and for providing a differentiated motor current signal including a first operational amplifier connected at an input terminal thereof ot the other leg of the resistor; and
a second operational amplifier connected at an input terminal thereof to an output terminal of the first operational amplifier;
means for providing a reference signal at a predetermined level;
means for comparing the differentiated signal at a predetermined level;
means for comparing the differentiated motor current signal and the signal at the predetermined level and for providing a comparison signal;
means for providing a signal during a predetermined internal;
means connected to the comparing means and the means for providing a signal during a predetermined interval and responsive to the signals therefrom for providing a first output signal at a first logic level when the comparison signal falls below the predetermined level during the predetermined interval, said first output signals being indicative that the motor shaft has taken a step, and for otherwise providing a second output signal, said second output signal being indicative that the motor shaft is stalled; and
means connected to the means for providing the first and second signals for verifying the position of the stepper motor shaft.

18. A sensor as described by claim 17, including:

operational amplifier means connected to the second operational amplifier of the differentiating means.

19. A sensor as described by claim 18, wherein the means for providing a reference signal at a predetermined level includes:
a variable resistor having one leg connected to a voltage source of one polarity and another leg connected to a voltage source of an opposite polarity.

20. A sensor as described by claim 19, wherein the comparing means includes:
an operational amplifier connected to the variable resistor and connected to the operational amplifier means.

21. A sensor as described by claim 17, wherein the providing a signal during a predetermined interval includes:
a first monostable multivibrator;
a clock for providing driving pulses;
the first monostable multivibrator connected to the clock and driven by the pulses therefrom; and
a second monostable multivibrator connected to the first monostable multivibrator and driven thereby for providing the signal during the predetermined interval.

22. A sensor as described by claim 21, including:
a signal source;
the motor including coil means, and normally open coil means; and
means connected to the clock and to the normally open switching means and responsive to the pulses provided by the clock for closing said switching means, whereby the signal from the signal source is applied to the motor coil means as a motor shaft step command signal for energizing the motor coil means.

23. With a stepper motor of the type which is energized by a motor shaft step command signal to provided a motor current, and including means for sensing the motor current to determine if the motor shaft has taken a step in response to the step command signal, the improvement comprising:
means for differentiating the sensed motor current and for providing a differentiated signal including a first operational amplifier connected to the means for sensing the motor current, and a second operational amplifier connected to the first operational amplifier and providing the differentiated signal.

24. The improvement as described by claim 23, including:
operational amplifier means conencted to the second operational amplifier.

25. The improvement as described by claim 24, wherein the means for providing a reference signal at a predetermined level includes:
a variable resistor having one leg connected to a voltage source of one polarity and another leg connected to a voltage source of an opposite polarity.

26. The improvement as described by claim 25, wherein the comparing means includes:
an operational amplifier connected to the variable resistor and connected to the operational amplifier means.

27. With a stepper motor of the type which is energized by a motor shaft step command signal to provide as motor current, and including means for sensing the motor current to determine if the motor shaft has taken a step in response to the step command signal, the improvement comprising:
means for differentiating the sensed motor current and for providing a differentiated signal;
means for providing a reference signal at a predetermined level;
means for providing a signal during a predetermined interval;
a first monostable multivibrator;
a clock for providing driving pulses, the first monostable multivibrator conencted to the clock and driven by the pulses therefrom; and;
a second monostable mutlivibrator connected to the first monostable multivibrator and driven thereby for providing the signal during the predetermined interval;
means for comparing the differentiated signal and the reference signal at the predetermined level and for providing a comparision signal; and
means connected to the comparing means and to the predetermined interval signal means and responsive to the signals therefrom for providing a signal indicative of the step status of the motor shaft.

28. The improvement as described by claim 27, including:
a signal source;
the motor including coil means, and normally open switching means connecting the signal source to the motor coil means; and
means connected to the clock and to the normally open switching means and responsive to the pulses provided by the clock for closing said switching means, whereby the signal from the signal source is applied to the motor coil means as a motor shaft step command signal for energizing the motor coil means.

* * * * *

UNITED STATES PATENT AND TRADEMARK OFFICE
CERTIFICATE OF CORRECTION

PATENT NO. : 4,791,343

DATED : December 13, 1988

INVENTOR(S) : Terry J. Ahrendt

It is certified that error appears in the above-identified patent and that said Letters Patent is hereby corrected as shown below:

```
Column 6, claim  1, line 14, "differnetiated" should read
                             -- differentiated --.
Column 7, claim 11, line 38, "stepped" should read -- stepper --.
          claim 13, line 56, "step" should read -- stepper --.
Column 8, claim 16, line 22, "he" should read -- the --.
          claim 17, line 37, "hte" should read -- the --.
                    line 40, "ot" should read -- to --.
Column 9, claim 23, line 39, "provided" should read -- provide --.
```

Signed and Sealed this

Twenty-ninth Day of August, 1989

Attest:

DONALD J. QUIGG

*Attesting Officer*   *Commissioner of Patents and Trademarks*